United States Patent
Moriyama et al.

(10) Patent No.: US 7,841,954 B2
(45) Date of Patent: Nov. 30, 2010

(54) MULTI-PIECE SOLID GOLF BALL

(75) Inventors: Keiji Moriyama, Kobe (JP); Akira Kato, Kobe (JP)

(73) Assignee: SRI Sports Limited, Kobe (JP)

( * ) Notice: Subject to any disclaimer, the term of this patent is extended or adjusted under 35 U.S.C. 154(b) by 862 days.

(21) Appl. No.: 10/263,642

(22) Filed: Oct. 4, 2002

(65) Prior Publication Data
US 2003/0119604 A1  Jun. 26, 2003

(30) Foreign Application Priority Data
Oct. 5, 2001   (JP)   ............................ 2001-309875

(51) Int. Cl.
*A63B 37/04*   (2006.01)
(52) U.S. Cl. ..................................... 473/376
(58) Field of Classification Search .......... 473/351–378
See application file for complete search history.

(56) References Cited

U.S. PATENT DOCUMENTS

| | | | | |
|---|---|---|---|---|
| 5,072,944 A | * | 12/1991 | Nakahara et al. | 473/373 |
| 5,553,852 A | | 9/1996 | Higuchi et al. | |
| 5,692,974 A | * | 12/1997 | Wu et al. | 473/377 |
| 5,711,723 A | * | 1/1998 | Hiraoka et al. | 473/374 |
| 5,782,707 A | | 7/1998 | Yamagishi et al. | |
| 5,820,487 A | * | 10/1998 | Nakamura et al. | 473/374 |
| 5,830,085 A | * | 11/1998 | Higuchi et al. | 473/373 |
| 5,876,294 A | | 3/1999 | Yamagishi et al. | |
| 5,899,822 A | | 5/1999 | Yamagishi et al. | |
| 6,190,269 B1 | * | 2/2001 | Moriyama | 473/373 |
| 6,207,784 B1 | * | 3/2001 | Rajagopalan | 528/71 |
| 6,287,218 B1 | * | 9/2001 | Ohama | 473/377 |
| 6,336,872 B1 | * | 1/2002 | Moriyama et al. | 473/374 |
| 6,390,935 B1 | * | 5/2002 | Sugimoto | 473/373 |
| 6,390,936 B1 | * | 5/2002 | Sugimoto | 473/374 |
| 6,520,872 B2 | * | 2/2003 | Endo et al. | 473/374 |
| 6,533,683 B2 | * | 3/2003 | Watanabe | 473/374 |
| 6,537,158 B2 | * | 3/2003 | Watanabe | 473/374 |
| 6,544,131 B1 | * | 4/2003 | Sano et al. | 473/374 |
| 6,551,202 B1 | * | 4/2003 | Yoshida | 473/376 |

(Continued)

FOREIGN PATENT DOCUMENTS

JP   2-239068   9/1997

(Continued)

*Primary Examiner*—Alvin A Hunter
(74) *Attorney, Agent, or Firm*—Birch, Stewart, Kolasch & Birch, LLP

(57) ABSTRACT

The present invention provides a multi-piece solid golf ball, which is superior in flight distance, spin performance and shot feel. The present invention relates to a multi-piece solid golf ball comprising a core consisting of a center and an intermediate layer, and a cover, wherein the center has surface hardness (D) higher than central point hardness by not less than 15, the intermediate layer and cover are formed from thermoplastic resin as a main component and have a thickness of not less than 0.3 to less than 1.0 mm, the cover has a hardness (F) of not less than 35 to less than 55, a hardness of the intermediate layer is higher than D and F, and a difference (A–B) between a deformation amount of the core (A) and that of the golf ball (B) is within the range of not less than 0.15 to less than 0.35 mm.

6 Claims, 1 Drawing Sheet

U.S. PATENT DOCUMENTS 6,558,275 B2 * 5/2003 Ohama ............... 473/273
6,561,925 B2 * 5/2003 Watanabe et al. ........ 473/371
6,561,929 B2 * 5/2003 Watanabe ............. 473/377

FOREIGN PATENT DOCUMENTS

| | | |
|---|---|---|
| JP | 10-151225 | 6/1998 |
| JP | 10-151226 | 6/1998 |
| JP | 2910516 | 4/1999 |

* cited by examiner

MULTI-PIECE SOLID GOLF BALL

BACKGROUND OF THE INVENTION

This non-provisional application claims priority under 35 U.S.C. §119(a) on Patent Application No. 2001-309875 filed in Japan on Oct. 5, 2001, which is herein incorporated by reference.

FIELD OF THE INVENTION

The present invention relates to a multi-piece solid golf ball. More particularly, it relates to a multi-piece solid golf ball which is superior in flight distance, spin performance and shot feel.

BACKGROUND OF THE INVENTION

As golf balls having high spin performance on approach shots and long flight distance, two-layer structured core type or two-layer structured cover type golf balls, which comprise a center formed from soft rubber, an intermediate layer formed on the center made from a rubber or resin which is relatively harder than the center and a cover formed from a soft material, have been proposed (Japanese Patent No. 2910516, Japanese Patent Publication Nos. 239068/1997, 151225/1998, 151226/1998 and the like).

In Japanese Patent No. 2910516, a multi-piece golf ball, in which the center has a diameter of not less than 29 mm, the intermediate layer has a JIS-C hardness of not less than 85, and the specific gravity of the center is larger than that of the intermediate layer, is described. However, since the intermediate layer and cover have large thickness, the golf ball as a whole is difficult to deform at the time of hitting. Therefore, the rebound characteristics of the resulting golf ball are poor, and the flight distance when hit by a driver is not sufficiently obtained.

In Japanese Patent Kokai Publication No. 239068/1997, a three-piece solid golf ball comprising a core, an intermediate layer and a cover is described. The core has a center hardness in JIS-C hardness of not more than 75 and a surface hardness, in JIS-C hardness, of not more than 85, the surface hardness of the core is higher than the center hardness of the core by 8 to 20, the hardness of the intermediate layer, in JIS-C hardness, is higher than the surface hardness of the core by not less than 5, and the hardness of the cover, in JIS-C hardness, is lower than that of the intermediate layer by not less than 5, and the dimples occupy at least 62% of the ball surface. However, since the hardness difference between the center hardness and the surface hardness of the center is small and the spin amount at the time of hitting is large, the flight distance when hit by a driver is not sufficiently obtained.

In Japanese Patent Publication No. 151225/1998, a three-piece solid golf ball comprising a solid core, an intermediate layer and a cover is described. The specific gravity of the solid core is lower than that of the intermediate layer and the cover, the hardness of the intermediate layer is higher than that of the core, and the ball as a whole has an inertia moment of at least 83 g-cm². In Japanese Patent Publication No. 151226/1998, a multi-piece golf ball is described, of which the center has a distortion of at least 2.5 mm under a load of 100 kg, the Shore D hardness of the intermediate layer is at least 13 degrees higher than that of the cover, and the ball as a whole has an inertia moment of at least 83 g-cm². However, since the thickness of the intermediate layer and that of the cover are large, the golf ball as a whole is difficult to deform at the time of hitting. Therefore, the rebound characteristics of the resulting golf ball are poor, and the flight distance when hit by a driver is not sufficiently obtained.

There has been no golf ball, which is superior in flight distance and shot feel as described above.

OBJECTS OF THE INVENTION

A main object of the present invention is to provide a multi-piece solid golf ball, which is superior in flight distance, spin performance and shot feel.

According to the present invention, the object described above has been accomplished by providing a multi-piece solid golf ball comprising a center, an intermediate layer and a cover, and by adjusting the hardness difference between the central point and surface of the center, the thickness of the intermediate layer, the difference in the deformation amount between the center and the core, the hardness difference between the intermediate layer and the center, the thickness and hardness of the cover, the hardness difference between the intermediate layer and the cover to specified ranges, thereby providing a multi-piece solid golf ball which is superior in flight distance, spin performance and shot feel.

This object as well as other objects and advantages of the present invention will become apparent to those skilled in the art from the following description with reference to the accompanying drawings.

BRIEF EXPLANATION OF DRAWINGS

The present invention will become more fully understood from the detailed description given hereinbelow and the accompanying drawings which are given by way of illustration only, and thus are not limitative of the present invention, and wherein.

SUMMARY OF THE INVENTION

Figure 1:
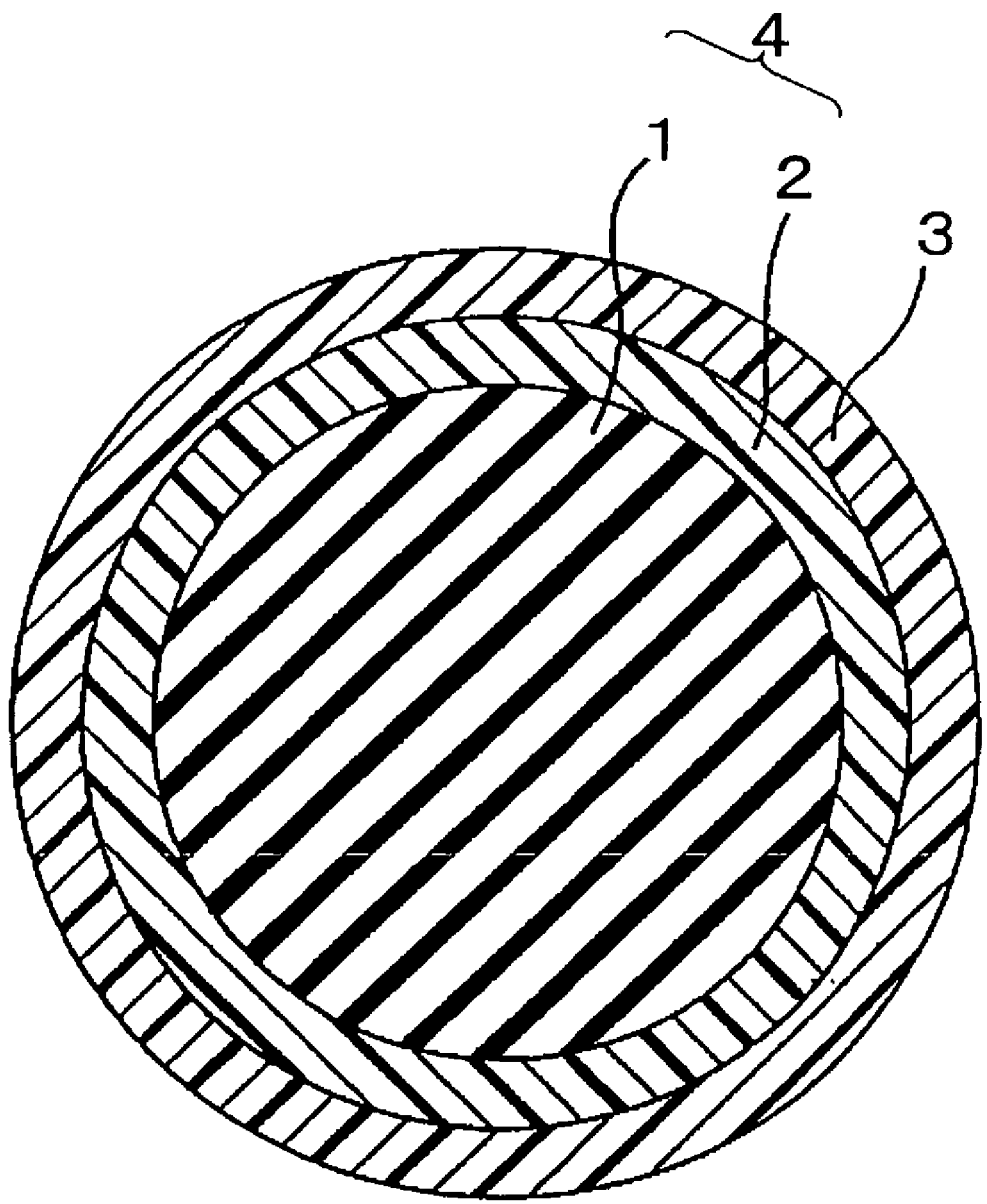
FIG. 1 is a schematic cross section illustrating one embodiment of the golf ball of the present invention.

The present invention provides a multi-piece solid golf ball comprising a core consisting of a center and an intermediate layer formed on the center, and a cover covering the core, wherein the center has a surface hardness in Shore D hardness higher than a central point in Shore D hardness by not less than 15, the intermediate layer is formed from thermoplastic resin as a main component and has a thickness of not less than 0.3 to less than 1.0 mm, the cover is formed from thermoplastic resin as a main component, and has a thickness of not less than 0.3 to less than 1.0 mm and a hardness in Shore D hardness of not less than 35 to less than 55, a hardness in Shore D hardness of the intermediate layer is higher than the surface hardness of the center and the hardness of the cover, and when a deformation amount of the center and that of the core when applying from an initial load of 98 N to a final load of 1275 N are represented by "A (mm)" and "B (mm)" respectively, the value of deformation amount difference (A–B) is within the range of not less than 0.15 mm to less than 0.35 mm.

In the golf ball of the present invention, since the center has a surface hardness in Shore D hardness higher than a central point in Shore D hardness by not less than 15, the resulting golf ball as a whole is easy to deform when hit by a golf club, and a high launch angle and a low spin amount are accomplished;

since the intermediate layer is formed from thermoplastic resin as a main component and has a thickness of not less than 0.3 mm to less than 1.0 mm, that is, the thickness of the intermediate layer is small even if the hardness of the intermediate layer is higher than that of the center and cover, the resulting golf ball as a whole is easy to deform when hit by a golf club, and the rebound characteristics are improved. When the thickness of the intermediate layer is too small, the deformation amount under high impact force when hit by a driver and the like is large, and the durability of the resulting golf ball is not sufficiently obtained.

Since the cover is formed from thermoplastic resin as a main component and has a thickness of not less than 0.3 mm to less than 1.0 mm and a hardness in Shore D hardness of not less than 35 to less than 55, the hardness of the cover is low, and the controllability under low impact force, for example, on approach shots, is improved. In addition, the thickness of the cover is small, and the rebound characteristics under high impact force when hit by a driver and the like are improved.

Since the hardness of the intermediate layer is higher than the surface hardness of the center and the hardness of the cover, the hardness of the cover is low, and the controllability under low impact force, for example, on approach shots is improved. The intermediate layer is hard in order to prevent the rebound characteristics from degrading, and the rebound characteristics of the resulting golf ball are improved.

Since the deformation amount difference between the center and the core when applying from an initial load of 98 N to a final load of 1275 N is within the range of not less than 0.15 mm to less than 0.35 mm, the optimum deformation of the resulting golf ball is obtained when hit by a golf club, and the rebound characteristics are improved.

In order to put the present invention into a more suitable practical application, it is desired that the center has a diameter of not less than 39.2 mm to less than 41.3 mm, and the intermediate layer has a hardness in Shore D hardness of not less than 62 to less than 65; and the intermediate layer be formed from a thermoplastic resin as a main component, and the cover be formed from polyurethane-based thermoplastic elastomer formed by using cycloaliphatic diisocyanate as a main component.

DETAILED DESCRIPTION OF THE INVENTION

The multi-piece solid golf ball of the present invention will be explained with reference to the accompanying drawing in detail. FIG. 1 is a schematic cross section illustrating one embodiment of the multi-piece solid golf ball of the present invention. As shown in FIG. 1, the golf ball of the present invention comprises a core 4 consisting of a center 1 and an intermediate layer 2 formed on the center 1, and a cover 3 covering the core 4. The cover may have single-layer structure or multi-layer structure, which has two or more layers. In FIG. 1, in order to explain the golf ball of the present invention simply, a golf ball having a one layer cover 3, that is, a three-piece solid golf ball will be used hereinafter for explanation.

It is desired for the center 1 to comprise polybutadiene rubber as a main component. The center is preferably obtained by press-molding a rubber composition under applied heat. The rubber composition essentially contains polybutadiene, a co-crosslinking agent, an organic peroxide and a filler.

The polybutadiene used for the center 1 of the present invention may be one, which has been conventionally used for cores of solid golf balls. Preferred is high-cis polybutadiene rubber containing a cis-1, 4 bond of not less than 40%, preferably not less than 80%. The high-cis polybutadiene rubber may be optionally mixed with natural rubber, polyisoprene rubber, styrene-butadiene rubber, ethylene-propylene-diene rubber (EPDM) and the like.

The co-crosslinking agent can be a metal salt of $\alpha,\beta$-unsaturated carboxylic acid, including mono or divalent metal salts, such as zinc or magnesium salts of $\alpha,\beta$-unsaturated carboxylic acids having 3 to 8 carbon atoms (e.g. acrylic acid, methacrylic acid, etc.), or a functional monomers (such as trimethylolpropane trimethacrylate, and the like) and the like. The preferred co-crosslinking agent is a zinc salt of $\alpha,\beta$-unsaturated carboxylic acid, particularly zinc acrylate, because it imparts high rebound characteristics to the resulting golf ball. The amount of the co-crosslinking agent is from 10 to 60 parts by weight, preferably from 10 to 50 parts by weight, more preferably from 20 to 45 parts by weight, based on 100 parts by weight of the polybutadiene. When the amount of the co-crosslinking agent is larger than 60 parts by weight, the center is too hard, and the shot feel of the resulting golf ball is poor. On the other hand, when the amount of the co-crosslinking agent is smaller than 10 parts by weight, it is required to increase an amount of the organic peroxide in order to impart a desired hardness to the center, and the rebound characteristics are degraded, which reduces the flight distance.

The organic peroxide includes, for example, dicumyl peroxide, 1,1-bis(t-butylperoxy)-3,3,5-trimethylcyclohexane, 2,5-dimethyl-2,5-di(t-butylperoxy) hexane, di-t-butyl peroxide and the like. The preferred organic peroxide is dicumyl peroxide. The amount of the organic peroxide is from 0.5 to 5.0 parts by weight, preferably 0.6 to 4.0 parts by weight, more preferably 0.6 to 2.0 parts by weight, based on 100 parts by weight of the polybutadiene. When the amount of the organic peroxide is smaller than 0.5 parts by weight, the center is too soft, and the rebound characteristics of the resulting golf ball are degraded, which reduces the flight distance. On the other hand, when the amount of the organic peroxide is larger than 5.0 parts by weight, it is required to decrease an amount of the co-crosslinking agent in order to impart a desired hardness to the center, and the rebound characteristics are degraded, which reduces the flight distance.

The filler, which can be typically used for the core of solid golf ball, includes for example, inorganic filler (such as zinc oxide, barium sulfate, calcium carbonate, magnesium oxide and the like), high specific gravity metal powder filler (such as tungsten powder, molybdenum powder and the like), and the mixture thereof. The amount of the filler is from 5 to 30 parts by weight, preferably from 5 to 20 parts by weight, based on 100 parts by weight of the polybutadiene. When the amount of the filler is smaller than 5 parts by weight, it is difficult to adjust the weight of the resulting golf ball. On the other hand, when the amount of the filler is larger than 30 parts by weight, the weight ratio of the rubber component in the center is small, and the rebound characteristics reduce too much.

The rubber compositions for the center of the golf ball of the present invention can contain other components, which have been conventionally used for preparing the core of solid golf balls, such as organic sulfide compound or antioxidant. If used, the amount is preferably 0.2 to 5.0 parts by weight, preferably 0.3 to 4.0 parts by weight, more preferably 0.5 to 2.0 parts by weight, based on 100 parts by weight of the polybutadiene.

The center 1 used for the golf ball of the present invention is obtained by mixing the rubber composition, followed by vulcanizing and press-molding the mixture in a mold. The vulcanization condition is not limited as long as the center has the following characteristics, but the vulcanization may be conducted at 140 to 180° C. and 2.9 to 11.8 MPa for 15 to 60 minutes. The vulcanization may be conducted in two or more stages of the temperature.

In the golf ball of the present invention, it is desired for the center 1 to have a diameter of not less than 39.2 to less than 41.3 mm, preferably 39.4 to 41.0 mm, more preferably 39.4 to 40.2 mm. When the diameter of the center is smaller than 39.2 mm, the spin amount at the time of hitting of the resulting golf ball is increased, and the hit golf ball creates blown-up trajectory, which reduces the flight distance. On the other hand, when the diameter of the center is not less than 41.3 mm, the thickness of the intermediate layer or the cover is too small, and the technical effects accomplished by the presence of the intermediate layer or the cover are not sufficiently obtained.

In the golf ball of the present invention, it is required for the center 1 to have a surface hardness in Shore D hardness higher than a central point in Shore D hardness by not less than 15, preferably 15 to 40, more preferably 15 to 35, most preferably 17 to 25. When the hardness difference between the surface hardness and central point hardness is smaller than 15, the technical effects of restraining the spin amount at the time of hitting are not sufficiently obtained, which reduces the flight distance, or the shot feel is hard or poor. On the other hand, when the hardness difference is too large, the deformation amount of the resulting golf ball when hit by a golf club is too large, and the rebound characteristics are degraded, which reduces the flight distance.

In the golf ball of the present invention, it is desired for the center 1 to have the central point hardness in Shore D hardness of 30 to 70, preferably 30 to 60, more preferably 30 to 50, most preferably 35 to 45. When the central point hardness is lower than 30, the center is too soft, and the rebound characteristics of the resulting golf ball are degraded, which reduces the flight distance, or the shot feel of the resulting golf ball is heavy and poor. In addition, it is required to increase the hardness of the intermediate layer in order to impart a proper hardness to the golf ball, and the durability is poor. On the other hand, when the surface hardness is higher than 70, a high launch angle is not sufficiently accomplished, which reduces the flight distance.

In the golf ball of the present invention, it is desired for the center 1 to have the surface hardness in Shore D hardness of 40 to 70, preferably 45 to 65, more preferably 50 to 65, most preferably 50 to 60. When the surface hardness is lower than 40, the center is too soft, and the rebound characteristics of the resulting golf ball are degraded, which reduces the flight distance. In addition, the shot feel is heavy and poor. On the other hand, when the surface hardness is higher than 70, the center is too hard, and the shot feel of the resulting golf ball is hard and poor.

The term "a surface hardness of the center" as used herein refers to the hardness, which is determined by measuring a hardness at the surface of the center prepared by press molding as described above, that is, at the surface of the center before covering with the intermediate layer. The term "a central point hardness of the center" as used herein refers to the hardness, which is determined by cutting the resulting center into two equal parts and then measuring a hardness at its central point in section.

In the golf ball of the present invention, it is desired for the center 1 to have a deformation amount when applying from an initial load of 98 N to a final load of 1275 N of 2.0 to 4.0 mm, preferably 2.5 to 3.5 mm, more preferably 2.8 to 3.2 mm. When the deformation amount of the center is smaller than 2.0 mm, the center is too hard, and the shot feel of the resulting golf ball is hard and poor. On the other hand, when the deformation amount is larger than 4.0 mm, the desired hardness of the resulting golf ball is not sufficiently obtained, and the rebound characteristics are degraded, which reduces the flight distance.

In the golf ball of the present invention, it is desired for the center 1 to have a specific gravity of 1.05 to 1.20, preferably 1.10 to 1.15. When the specific gravity of the center is smaller than 1.05, the weight of the resulting golf ball is light, and the hit golf ball creates weak trajectory, which reduces the flight distance. On the other hand, when the specific gravity is larger than 1.20, the amount of the filler in the center is large, and the degree of crosslinking of the rubber component is low, which degrades the rebound characteristics. The term "a specific gravity of the center 1" as used herein refers to the specific gravity, which is determined by measuring a specific gravity with a sample of the center cutting from molded golf ball. The intermediate layer 2 is then formed on the center 1.

In the golf ball of the present invention, it is required for the intermediate layer 2 to have a thickness of not less than 0.3 to less than 1.0 mm, preferably 0.4 to 0.9 mm, more preferably 0.5 to 0.9 mm. When the thickness is smaller than 0.3 mm, the technical effect accomplished by the hardness of the intermediate layer is not sufficiently obtained, and the spin amount at the time of hitting can not be sufficiently restrained. On the other hand, when the thickness is not less than 1.0 mm, since the intermediate layer is formed from a relatively hard material, the shot feel is hard and poor.

In the golf ball of the present invention, it is required that a hardness in Shore D hardness of the intermediate layer 2 be higher than the surface hardness of the center 1, and the hardness difference between the intermediate layer and the surface of the center is preferably 1 to 20, more preferably 2 to 15, most preferably 2 to 10. When the hardness of the intermediate layer is not more than the surface hardness of the center, the spin amount at the time of hitting is increased, and the hit golf ball creates blown-up trajectory, which reduces the flight distance. When the hardness difference is too large, the intermediate layer is too hard, and the shot feel of the resulting golf ball is hard and poor. In addition, the scuff resistance and durability are degraded.

In the golf ball of the present invention, it is desired for the intermediate layer 2 to have a hardness in Shore D hardness of not less than 62 to less than 65, preferably 62 to 64, more preferably 62 to 63. When the hardness is lower than 62, the deformation at the time of hitting of the resulting golf ball is too large, and the rebound characteristics are degraded, which reduces the flight distance. On the other hand, when the hardness is 65 or higher, the shot feel is hard and poor. The term "a hardness of the intermediate layer" as used herein refers to the hardness, which is determined by measuring a hardness (slab hardness) using a sample of a stack of the three or more heat and press molded sheets having a thickness of about 2 mm from each intermediate layer composition, which had been stored at 23° C. for 2 weeks.

In the golf ball of the present invention, it is desired for the intermediate layer 2 to have a specific gravity of 0.9 to 1.05, preferably 0.9 to 1.0. When the specific gravity of the intermediate layer is smaller than 0.9, the moment of inertia of the resulting golf ball is small, and the decrement of the spin amount on the fly is large, which reduces the flight distance. On the other hand, when the specific gravity of the intermediate layer is larger than 1.05, the technical effects of improving the rebound characteristics accomplished by the presence of the intermediate layer is not sufficiently obtained. The term "a specific gravity of the intermediate layer" as used herein refers to the specific gravity, which is determined by measuring a specific gravity with a sample of the intermediate layer cut from the molded golf ball.

In the golf ball of the present invention, it is required for the intermediate layer to be formed from a thermoplastic resin as a main component, preferably an ionomer resin, which has been conventionally used for the cover of golf balls, as a base resin. The ionomer resin may be a copolymer of α-olefin and α,β-unsaturated carboxylic acid, of which a portion of carboxylic acid groups is neutralized with metal ion, a terpolymer of ethylene, α,β-unsaturated carboxylic acid and α,β-unsaturated carboxylic acid ester, of which a portion of carboxylic acid groups is neutralized with metal ion, or mixtures thereof. Examples of the α-olefin in the ionomer preferably include ethylene and propylene. Examples of the α,β-unsaturated carboxylic acid in the ionomer include acrylic acid, methacrylic acid, fumaric acid, maleic acid, crotonic acid and the like, and preferred are acrylic acid and methacrylic acid. Examples of the α,β-unsaturated carboxylic acid ester in the ionomer include methyl ester, ethyl ester, propyl ester, n-butyl ester and isobutyl ester of acrylic acid, methacrylic acid, fumaric acid, maleic acid, crotonic acid and the like. Preferred are acrylic acid esters and methacrylic acid esters. The metal ion which neutralizes a portion of carboxylic acid groups of the copolymer or terpolymer includes alkaline metal ion, such as sodium ion, potassium ion, lithium ion and the like; divalent metal ion, such as zinc ion, calcium ion, magnesium ion, and the like; trivalent metal ion, such as aluminum ion, neodymium ion, and the like; and the mixture thereof. Preferred are sodium ions, zinc ions, lithium ions and the like, in view of rebound characteristics, durability and the like. Sodium ion, zinc ion, lithium ion and the like is typically used, because of the rebound characteristics, durability and the like.

The ionomer resin is not limited, but examples thereof will be shown by a trade name thereof. Examples of the ionomer resins, which are commercially available from Du Pont-Mitsui Polychemicals Co., Ltd. include Hi-milan 1555, Hi-milan 1557, Hi-milan 1601, Hi-milan 1605, Hi-milan 1652, Hi-milan 1702, Hi-milan 1705, Hi-milan 1706, Hi-milan 1707, Hi-milan 1855, Hi-milan 1856, Hi-milan AM7316 and the like. Examples of the ionomer resins, which are commercially available from Du Pont Co., include Surlyn 8945, Surlyn 9945, Surlyn 6320, Surlyn 8320, Surlyn AD8511, Surlyn AD8512, Surlyn AD8542 and the like. Examples of the ionomer resins, which are commercially available from Exxon Chemical Co., include Iotek 7010, Iotek 8000 and the like. These ionomer resins may be used alone or in combination.

As the materials suitably used in the intermediate layer 2 of the present invention, the above ionomer resin may be used alone, but the ionomer resin may be used in combination with thermoplastic elastomer. Examples of the thermoplastic elastomers are not limited, but include polyurethane-based elastomer, polyamide-based thermoplastic elastomer, polyester-based thermoplastic elastomer, styrene-based thermoplastic elastomer, polyolefin-based thermoplastic elastomer and the like. Preferred is polyamide-based thermoplastic elastomer. Examples thereof include polyamide-based thermoplastic elastomer, which is commercially available from Toray Co., Ltd. under the trade name of "Pebax" (such as "Pebax 2533") and the like.

A method of forming on the center 1, the intermediate layer 2, is not specifically limited, but may be any conventional methods which have been known in the art and used for forming the cover of the golf balls. For example, there can be used a method comprising molding the intermediate layer composition into a semi-spherical half-shell in advance, covering the core with the two half-shells, followed by press molding at 130 to 170° C. for 1 to 5 minutes, or a method comprising injection molding the intermediate layer composition directly on the center, which is covered with the cover, to cover it. The intermediate layer 2 is formed on the center 1 to form the core 4 having two-layer structure by using the above method.

In the golf ball of the present invention, it is desired for the core 4 to have a deformation amount when applying from an initial load of 98 N to a final load of 1275 N of 2.0 to 4.0 mm, preferably 2.2 to 3.5 mm, more preferably 2.5 to 3.3 mm, most preferably 2.5 to 3.0 mm. When the deformation amount of the core is smaller than 2.0 mm, the core is too hard, and the shot feel of the resulting golf ball is poor. On the other hand, when the deformation amount is larger than 4.0 mm, the core is too soft, and the durability of the resulting golf ball is poor. In addition, the rebound characteristics are degraded, which reduces the flight distance.

In the golf ball of the present invention, when a deformation amount of the center and that of the core when applying from an initial load of 98 N to a final load of 1275 N are represented by "A (mm)" and "B (mm)" respectively, it is required for the value of deformation amount difference (A−B) to be within the range of not less than 0.15 mm to less than 0.35 mm, preferably 0.16 to 0.34 mm, more preferably 0.18 to 0.30 mm. When the deformation amount difference is smaller than 0.15 mm, the deformation amount of the golf ball is too large, and loss of elastic recovery occurs, which degrades the rebound characteristics. On the other hand, when the deformation amount difference is not less than 0.35 mm, the deformation amount of the golf ball is not large when impact force from the outer is applied on the golf ball, and the rebound characteristics are not sufficiently obtained.

In the present invention, the spin amount at the time of hitting is retained from increasing to improve the flight distance and the hardness of the intermediate layer is restrained from increasing too much to improve the shot feel, by adjusting the hardness difference between the center 1 and the intermediate layer 2 to the range described above. In addition thereto, the deformation amount of the golf ball when hit by a golf club is optimized by adjusting the deformation amount difference (A−B) between the center 1 and the core 4 under applied load, which is not merely the hardness difference, to the range described above, and the rebound characteristics are improved. The technical meaning of the deformation amount difference (A−B) is the value for assuming the deformation when impact force is applied on the golf ball with a golf club. In addition, the optimum value of the initial flight performance of the golf ball has been obtained by representing strength difference at the time of deforming, which is not hardness difference, of the golf ball with the value of (A−B), assuming that the center and the core (center+intermediate layer) particularly have a great effect on behavior of the golf ball under applied high impact force when hit by a driver to a middle iron club.

At least one layer of cover 3 are then covered on the core 4. In the golf ball of the present invention, it is required for the cover 3 to have a thickness of not less than 0.3 mm to less than 1.0 mm, preferably 0.4 to 0.9 mm, more preferably 0.5 to 0.9 mm, most preferably 0.5 to 0.8 mm. When the thickness is smaller than 0.3 mm, the technical effects accomplished by softening the cover are not sufficiently obtained, and the spin amount at short iron shot to approach shot is small, which degrades the controllability. On the other hand, when the thickness of the cover is not less than 1.0 mm, the rebound characteristics of the resulting golf ball are degraded and the spin amount at the time of hitting is increased, and the hit golf ball creates blown-up trajectory, which reduces the flight distance.

In the golf ball of the present invention, it is required that the hardness in Shore D hardness of the intermediate layer 2 be higher than that of the cover 3, and the hardness difference between the intermediate layer and cover is within the range of preferably 1 to 35, more preferably 5 to 30, most preferably 7 to 23. When the hardness of the intermediate layer is not more than that of the cover, the hardness of the cover is too high, and the spin amount at approach shot and the like is small, which degrades the controllability. When the hardness difference between the intermediate layer and the cover is too large, the hardness of the cover is too low, and the rebound characteristics are degraded. In addition, the spin amount is increased, and the hit golf ball creates blown-up trajectory, which reduces the flight distance.

In the golf ball of the present invention, it is required for the cover 3 to have a hardness in Shore D hardness of not less than 35 to less than 55, preferably 35 to 53, more preferably 40 to 52. When the hardness of the cover 3 is lower than 35, the spin amount at the time of hitting is increased, and the hit golf ball creates blown-up trajectory, which reduces the flight distance. On the other hand, when the hardness of the cover is not less than 55, the spin amount at the time of hitting at short iron shot to approach shot and the like is decreased, and the controllability is poor. The term "a hardness of the cover" as used herein is determined by measuring a hardness (slab hardness) using a sample of a stack of the three or more heat and press molded sheets having a thickness of about 2 mm from the composition for the cover, which had been stored at 23° C. for 2 weeks.

In the golf ball of the present invention, it is required for the cover to be formed from thermoplastic resin as a main component, preferably polyurethane-based thermoplastic elastomer as a main component in view of scuff resistance, more preferably polyurethane-based thermoplastic elastomer formed by using cycloaliphatic diisocyanate in view of rebound characteristics, scuff resistance and yellowing resistance.

Examples of the cycloaliphatic diisocyanates include one or combination of two or more selected from the group consisting of 4,4'-dicyclohexylmethane diisocyanate ($H_{12}MDI$), which is hydrogenated compound of 4,4'-diphenylmethane diisocyanate (MDI); 1,3-bis(isocyanatomethyl)cyclohexane ($H_6XDI$), which is hydrogenated compound of xylylene diisocyanate (XDI); isophorone diisocyanate (IPDI); and trans-1,4-cyclohexane diisocyanate (CHDI). Preferred is the $H_{12}MDI$ in view of general-purpose properties and processability.

Examples of the polyurethane-based thermoplastic elastomers include polyurethane-based thermoplastic elastomer formed by using the $H_{12}MDI$, which is commercially available from BASF Polyurethane Elastomers Co., Ltd. under the trade name "Elastollan" (such as "Elastollan XNY585", "Elastollan XNY90A", "Elastollan XNY97A") and the like.

As a suitable materials used in the cover 3 of the present invention, the above polyurethane-based thermoplastic elastomer may be used alone, but the polyurethane-based thermoplastic elastomer may be used in combination with at least one of the other thermoplastic elastomer, diene-based block copolymer, ionomer resin and the like. Examples of the other thermoplastic elastomers include the other polyurethane-based thermoplastic elastomer, polyamide-based thermoplastic elastomer, polyester thermoplastic elastomer, polystyrene-based thermoplastic elastomer, polyolefin-based thermoplastic elastomer and the like. The other thermoplastic elastomer may have functional group, such as carboxyl group, glycidyl group, sulfone group, epoxy group and the like.

Examples of the other thermoplastic elastomers include polyurethane-based elastomer, which is commercially available from BASF Polyurethane Elastomers Co., Ltd. under the trade name of "Elastollan" (such as "Elastollan ET880"); polyamide-based thermoplastic elastomer, which is commercially available from Atofina Japan Co., Ltd. under the trade name of "Pebax" (such as "Pebax 2533"); polyester-based thermoplastic elastomer, which is commercially available from Toray-Du Pont Co., Ltd. under the trade name of "Hytrel" (such as "Hytrel 3548", "Hytrel 4047"); styrene-based thermoplastic elastomer available from Asahi Kasei Corporation under the trade name "Tuftec" (such as "Tuftec H1051"); olefin-based thermoplastic elastomer available from Mitsubishi Chemical Co., Ltd. under the trade name "Thermoran" (such as "Thermoran 3981N"); polyolefin-based thermoplastic elastomer, which is commercially available from Sumitomo Chemical Co., Ltd. under the trade name of "Sumitomo TPE" (such as "Sumitomo TPE3682" and "Sumitomo TPE9455"); and the like.

The diene-based block copolymer is a block copolymer or partially hydrogenated block copolymer having double bond derived from conjugated diene compound. The base bock copolymer is block copolymer composed of block polymer block A mainly comprising at least one aromatic vinyl compound and polymer block B mainly comprising at least one conjugated diene compound. The partially hydrogenated block copolymer is obtained by hydrogenating the block copolymer. Examples of the aromatic vinyl compounds comprising the block copolymer include styrene, α-methyl styrene, vinyl toluene, p-t-butyl styrene, 1,1-diphenyl styrene and the like, or mixtures thereof. Preferred is styrene. Examples of the conjugated diene compounds include butadiene, isoprene, 1,3-pentadiene, 2,3-dimethyl-1,3-butadiene and the like, or mixtures thereof. Preferred are butadiene, isoprene and combinations thereof. Examples of the diene block copolymers include an SBS (styrene-butadiene-styrene) block copolymer having polybutadiene block with epoxy groups or SIS (styrene-isoprene-styrene) block copolymer having polyisoprene block with epoxy groups and the like. Examples of the diene block copolymers, which is commercially available, include the diene block copolymers, which are commercially available from Daicel Chemical Industries, Ltd. under the trade name of "Epofriend" (such as "Epofriend A1010"), the diene-based block copolymers, which are commercially available from Kuraray Co., Ltd. under the trade name of "Septon" (such as "Septon HG-252" and the like) and the like.

As the above ionomer resin, ionomer resin, which is the same as used in the intermediate layer, may be used.

The amount of the other thermoplastic elastomer, diene block copolymer or ionomer resin is 0 to 40 parts by weight, preferably 0 to 30 parts by weight, based on 100 parts by weight of the base resin for the cover. When the amount is larger than 40 parts by weight, either scuff resistance, rebound characteristics or yellowing resistance are degraded.

The composition for the cover 3 used in the present invention may optionally contain pigments (such as titanium dioxide, etc.) and the other additives such as a dispersant, an antioxidant, a UV absorber, a photostabilizer and a fluorescent agent or a fluorescent brightener, etc., in addition to the resin component as long as the addition of the additives does not deteriorate the desired performance of the golf ball cover.

If used, the amount of the pigment is preferably 0.1 to 5.0 parts by weight, based on 100 parts by weight of the base resin for the cover.

A method of covering on the core 4 with the cover 3 is not specifically limited, but may be a conventional method. For example, there can be used a method comprising molding the cover composition into a semi-spherical half-shell in advance, covering the core with the two half-shells, followed by press molding at 130 to 170° C. for 1 to 5 minutes, or a method comprising injection molding the cover composition directly on the core, which is covered with the cover, to cover it.

At the time of molding the cover, many depressions called "dimples" are formed on the surface of the golf ball. Furthermore, paint finishing or marking with a stamp may be optionally provided after the cover is molded for commercial purposes.

The golf ball of the present invention is formed, so that it has a diameter of not less than 42.67 mm (preferably 42.67 to 42.82 mm) and a weight of not more than 45.93 g, in accordance with the regulations for golf balls.

EXAMPLES

The following Examples and Comparative Examples further illustrate the present invention in detail but are not to be construed to limit the scope of the present invention.

(1) Production of Core (i) Production of Center

The rubber compositions for the center having the formulation shown in Table 1 were mixed, and then vulcanized by press-molding in the mold at the vulcanization condition shown in the same Table to obtain spherical centers. The diameter, weight, specific gravity, deformation amount (A), central point hardness (C) and surface hardness (D) of the resulting centers were measured. The results are shown in Table 3. The hardness difference (D–C) between the surface hardness (D) and the central point hardness (C) of the resulting centers was determined by calculation. The results are shown in the same Tables.

(ii) Preparation of Compositions for Intermediate Layer

The formulation materials for the intermediate layer shown in Table 1 were mixed using a kneading type twin-screw extruder to obtain pelletized intermediate layer compositions. The extrusion condition was, a screw diameter of 45 mm,
a screw speed of 200 rpm, and
a screw L/D of 35.

The formulation materials were heated at 160 to 260° C. at the die position of the extruder. The Shore D hardness were measured, using a sample of a stack of the three or more heat and press molded sheets having a thickness of about 2 mm from each intermediate layer composition, which had been stored at 23° C. for 2 weeks. The results are shown in Table 3 as the hardness of the intermediate layer (E). The hardness differences (E–D) between the hardness of the intermediate layer (E) and the surface hardness of the center (D) were determined by calculating from the above values of E and D, and the result is shown in the same Table.

(iii) Covering with the Intermediate Layer

The compositions for the intermediate layer were injection-molded to obtain semi-spherical half-shells for the intermediate layer. The center produced in the step (i) was covered with the two semi-spherical half-shells for the intermediate layer and then press-molded in the mold at 150° C. for 2 minutes to obtain two-layer structured cores. The two-layer structured core 4 was consisted of the center 1 and the intermediate layer 2 having the thickness and specific gravity shown in Table 3 covered on the center. The diameter, weight, and deformation amount (B) of the resulting two-layer structured core were measured. The results are shown in Table 3. The deformation amount differences (A–B) between the deformation amount of the center (A) and that of the core (B) were determined by calculating from the above values of A and B, and the result is shown in the same Table.

TABLE 1

| | (parts by weight) | | | | | | |
|---|---|---|---|---|---|---|---|
| Core composition | A | B | C | D | E | F | G |
| (Center composition) | | | | | | | |
| BR11 *1 | 100 | 100 | 100 | 100 | 100 | 100 | 100 |
| Zinc acrylate | 36.5 | 37.0 | 36.5 | 36.5 | 34.0 | 36.5 | 33.0 |
| Zinc oxide | 5 | 5 | 5 | 5 | 5 | 5 | 5 |
| Barium sulfate | 9.7 | 7.7 | 9.7 | 9.7 | 14.3 | 11.5 | 11.0 |
| Dicumyl peroxide | 0.8 | 0.8 | 0.8 | 0.8 | 0.8 | 0.8 | 0.8 |
| Diphenyl disulfide | 0.5 | 0.5 | 0.5 | 0.5 | 0.5 | 0.5 | 0.5 |
| Vulcanization condition | | | | | | | |
| Temperature (° C.) | 170 | 170 | 170 | 170 | 170 | 170 | 155 |
| Time (min) | 15 | 15 | 15 | 15 | 15 | 15 | 20 |
| (Intermediate layer) | | | | | | | |
| Hi-milan 1605 *2 | 60 | 60 | 60 | 40 | 60 | 60 | 60 |
| Hi-milan 1706 *3 | 40 | 40 | 40 | 40 | 40 | 40 | 40 |
| Hi-milan 1855 *4 | — | — | — | 20 | — | — | — |

*1: BR-11 (trade name), high-cis polybutadiene commercially available from JSR Co., Ltd. (Content of 1,4-cis-polybutadiene: 96%)
*2: Hi-milan 1605 (trade name), ethylene-methacrylic acid copolymer ionomer resin obtained by neutralizing with sodium ion, manufactured by Du Pont-Mitsui Polychemicals Co., Ltd.
*3: Hi-milan 1706 (trade name), ethylene-methacrylic acid copolymer ionomer resin obtained by neutralizing with zinc ion, manufactured by Du Pont-Mitsui Polychemicals Co., Ltd.
*4: Hi-milan 1855 (trade name), ethylene-methacrylic acid-isobutyl acrylate terpolymer ionomer resin obtained by neutralizing with zinc ion, manufactured by Du Pont-Mitsui Polychemicals Co., Ltd.

(2) Preparation of Compositions for Cover

The formulation materials for the cover shown in Table 2 were mixed using a kneading type twin-screw extruder to obtain pelletized cover compositions. The extrusion condition was, a screw diameter of 45 mm,
a screw speed of 200 rpm, and
a screw L/D of 35.

The formulation materials were heated at 160 to 260° C. at the die position of the extruder. The Shore D hardness were measured, using a sample of a stack of the three or more heat and press molded sheets having a thickness of about 2 mm from each cover composition, which had been stored at 23° C. for 2 weeks. The results are shown in Tables 2 and 3 as the cover hardness (F). The hardness differences (E–F) between the hardness of the intermediate layer and cover hardness were determined by calculating from the above values of E and F, and the result is shown in Table 3.

TABLE 2

| | (parts by weight) | |
|---|---|---|
| Cover composition | a | b |
| Elastollan XNY585 *5 | 100 | — |
| Elastollan XNY97A *6 | — | 100 |

TABLE 2-continued

| Cover composition | (parts by weight) | |
|---|---|---|
| | a | b |
| Titanium dioxide | 4 | 4 |
| Cover hardness (Shore D) | 40 | 52 |

*5: Elastollan XNY585 (trade name), polyurethane-based thermoplastic elastomer formed by using 4,4'-dicyclohexylmethane diisocyanate ($H_{12}MDI$) (=hydrogenated MDI), commercially available from BASF Polyurethane Elastomers Co., Ltd.
*6: Elastollan XNY97A (trade name), polyurethane-based thermoplastic elastomer formed by using 4,4'-dicyclohexylmethane diisocyanate ($H_{12}MDI$) (=hydrogenated MDI), commercially available from BASF Polyurethane Elastomers Co., Ltd.

Examples 1 to 4 and Comparative Examples 1 to 3

The cover composition was injection molded to obtain semi-spherical half-shell for the cover. The two-layer structured core produced in the step (iii) was covered with the two semi-spherical half-shells for the cover and then press-molded in the mold at 160° C. for 2 minutes to form a cover layer having a thickness shown in Table 3. Then, clear paint was applied on the surface to produce golf ball having a diameter of 42.8 mm and a weight of 45.4 g. With respect to the resulting golf balls, the flight performance and shot feel were measured or evaluated. The results are shown in Table 4.

The test methods are as follows.

(Test Method)

(1) Hardness of Center

The surface hardness of the center is determined by measuring a Shore D hardness at the surface of the center prepared. The central point hardness of the center is determined by measuring a Shore D hardness at the central point of the center in section, after the center is cut into two equal parts. Shore D hardness is measured with a Shore D hardness meter according to ASTM-D 2240.

(2) Deformation Amount

The deformation amount of was determined by measuring a deformation amount when applying from an initial load of 98 N to a final load of 1275 N on the center or core.

(3) Hardness of Intermediate Layer and Cover

The hardness of the intermediate layer and the hardness of the cover are determined by measuring a hardness, using a sample of a stack of the three or more heat and press molded sheets having a thickness of about 2 mm from each intermediate layer composition and each cover composition, which had been stored at 23° C. for 2 weeks, with a Shore D hardness meter according to ASTM D-2240.

(4) Flight Performance (1)

After a No. 1 wood club (a driver, W#1; "XXIO" loft angle=8 degrees, X shaft, manufactured by Sumitomo Rubber Industries, Ltd.) having metal head was mounted to a swing robot manufactured by Golf Laboratory Co. and each golf ball was hit at head speed of 50 m/sec, the initial velocity and spin amount (backspin amount) immediately after hitting, and flight distance were measured. As the flight distance, total that is a distance to the stop point of the hit golf ball was measured. The measurement was conducted 12 times for each golf ball (n=12), and the average is shown as the result of the golf ball.

(5) Flight Performance (2)

After a sand wedge (SW; "DP-601", manufactured by Sumitomo Rubber Industries, Ltd.) was mounted to a swing robot manufactured by Golf Laboratory Co. and a golf ball was hit at head speed of 21 m/sec, the spin amount (backspin amount) immediately after hitting was measured. The measurement was conducted 12 times for each golf ball (n=12), and the average is shown as the result of the golf ball.

(6) Shot Feel (Impact Force)

The shot feel of the golf ball is evaluated by 10 golfers according to a practical hitting test using a No. 1 wood club (W#1, a driver) having a metal head. The evaluation criteria are as follows. The results shown in the Tables below are based on the fact that the most golfers evaluated with the same criterion about shot feel.

Evaluation Criteria

◯: The golfers felt that the golf ball has soft and good shot feel such that the impact force is small.

Δ: The golfers felt that the golf ball has fairly good shot feel.

x: The golfers felt that the golf ball has hard and poor shot feel such that the impact force is large.

(7) Shot Feel (Rebound)

The shot feel of the golf ball is evaluated by 10 golfers according to a practical hitting test using a No. 1 wood club (W#1, a driver) having a metal head. The evaluation criteria are as follows. The results shown in the Tables below are based on the fact that the most golfers evaluated with the same criterion about shot feel.

Evaluation Criteria

◯: The golfers felt that the golf ball has good shot feel such that the rebound characteristics are good.

Δ: The golfers felt that the golf ball has fairly good shot feel.

x: The golfers felt that the golf ball has heavy and poor shot feel such that the rebound characteristics are poor.

(Test Results)

TABLE 3

| Test item | Example No. | | | | Comparative Example No. | | |
|---|---|---|---|---|---|---|---|
| | 1 | 2 | 3 | 4 | 1 | 2 | 3 |
| Core composition (Center) | A | B | C | D | E | F | G |
| Diameter (mm) | 39.4 | 40.2 | 40.0 | 39.4 | 38.2 | 38.0 | 39.4 |
| Weight (g) | 36.2 | 38.1 | 37.9 | 36.2 | 33.5 | 32.6 | 36.2 |
| Specific gravity | 1.13 | 1.12 | 1.13 | 1.13 | 1.15 | 1.14 | 1.13 |
| Deformation amount (A) (nm) | 3.00 | 2.90 | 3.00 | 3.00 | 3.50 | 2.95 | 2.75 |
| Shore D hardness | | | | | | | |
| Central point hardness (C) | 39 | 41 | 39 | 39 | 37 | 40 | 45 |
| Surface hardness (D) | 57 | 58 | 57 | 57 | 56 | 57 | 57 |
| Difference (D − C) | 18 | 17 | 18 | 18 | 19 | 17 | 12 |
| (Intermediate layer) | | | | | | | |
| Thickness (mm) | 0.9 | 0.5 | 0.9 | 0.9 | 1.5 | 0.9 | 0.9 |
| Specific gravity | 0.95 | 0.95 | 0.95 | 0.95 | 0.95 | 0.95 | 0.95 |
| Shore D hardness (E) | 63 | 63 | 63 | 59 | 63 | 63 | 63 |
| Difference (E − D) | 6 | 5 | 6 | 2 | 7 | 6 | 6 |
| (Core) | | | | | | | |
| Diameter (mm) | 41.2 | 41.2 | 41.8 | 41.2 | 41.2 | 39.8 | 41.2 |
| Weight (g) | 40.6 | 40.6 | 42.3 | 40.6 | 40.6 | 36.6 | 40.6 |
| Deformation amount (B) (mm) | 2.70 | 2.72 | 2.70 | 2.75 | 3.05 | 2.68 | 2.45 |
| Difference (A − B) (mm) | 0.30 | 0.18 | 0.30 | 0.25 | 0.45 | 0.27 | 0.30 |
| (Cover) | | | | | | | |
| Composition | b | b | a | b | b | b | b |
| Thickness (mm) | 0.8 | 0.8 | 0.5 | 0.8 | 0.8 | 1.5 | 0.8 |
| Shore D hardness (F) | 52 | 52 | 40 | 52 | 52 | 52 | 52 |
| Difference (E − F) | 11 | 11 | 23 | 7 | 11 | 11 | 11 |

TABLE 4

| Test item | Example No. 1 | 2 | 3 | 4 | Comparative Example No. 1 | 2 | 3 |
|---|---|---|---|---|---|---|---|
| Flight performance (1) (W#1; 50 m/sec) | | | | | | | |
| Initial velocity (m/sec) | 72.2 | 72.2 | 72.3 | 72.1 | 71.8 | 71.7 | 72.3 |
| Spin amount (rpm) | 2580 | 2540 | 2500 | 2620 | 2780 | 2640 | 2730 |
| Total (m) | 269.8 | 270.0 | 271.3 | 268.2 | 262.0 | 263.5 | 265.8 |
| Flight performance (2) (SW; 21 m/sec) | | | | | | | |
| Spin amount (rpm) | 7030 | 7040 | 7000 | 7020 | 7080 | 7120 | 7040 |
| Shot feel | | | | | | | |
| Impact force | ○ | ○ | ○ | ○ | Δ | Δ | Δ |
| Rebound | ○ | ○ | ○ | ○ | Δ | x | ○ |

As is apparent from the results of Tables 3 and 4, the golf balls of the present invention of Examples 1 to 4, when compared with the golf balls of Comparative Examples 1 to 3, are superior in flight distance, spin performance and shot feel.

On the other hand, in the golf balls of Comparative Example 1, since the thickness of the intermediate layer is large, the initial velocity is small and the spin amount when hit by a driver is large, which reduces the flight distance. In addition, the shot feel is poor.

In the golf ball of Comparative Example 2, since the thickness of the cover is too large, the initial velocity is small and the spin amount when hit by a driver is large, which reduces the flight distance. In addition, the shot feel is poor.

In the golf balls of Comparative Example 3, since the hardness difference (D–C) is small, the spin amount when hit by a driver is large, which reduces the flight distance. In addition, the shot feel is poor.

What is claimed is:

1. A multi-piece solid golf ball which consists essentially of a core consisting of a center and an intermediate layer formed on the center, and a cover covering the core, wherein
   the center has a diameter of not less than 39.2 mm to less than 41.3 mm, a surface hardness in Shore D hardness higher than a central point in Shore D hardness by 15 to 40,
   the intermediate layer is formed from thermoplastic resin as a main component and has a thickness of not less than 0.3 to less than 1.0 mm,
   the cover is formed from a polyurethane-based thermoplastic elastomer formed by using cycloaliphatic diisocyanate as a main component, and has a thickness of not less than 0.3 to less than 1.0 mm and a hardness in Shore D hardness of not less than 35 to less than 55,
   a hardness in Shore D hardness of the intermediate layer is higher than the surface hardness of the center and the hardness of the cover, and
   when a deformation amount of the center and that of the core when applying from an initial load of 98 N to a final load of 1275 N are represented by "A (mm)" and "B (mm)" respectively, the value of deformation amount difference (A–B) is within the range of not less than 0.15 mm to less than 0.35 mm.

2. The multi-piece solid golf ball according to claim 1, wherein the intermediate layer has a hardness in Shore D hardness of not less than 62 to less than 65.

3. The multi-piece solid golf ball according to claim 1, wherein the polyurethane-based thermoplastic elastomer of the cover is formed by using 4,4' dicyclohexylmethane diisocyanate.

4. A multi-piece solid golf ball comprising a core containing a center and an intermediate layer formed on the center, and a cover covering the core, wherein
   the center has a surface hardness in Shore D hardness higher than a central point in Shore D hardness by 15 to 40 and has a diameter of not less than 39.2 mm to less than 41.3 mm,
   the intermediate layer is formed from an ionomer resin as a main component and has a thickness of not less than 0.3 to less than 1.0 mm,
   the cover is formed from a polyurethane-based thermoplastic elastomer as a main component, and has a thickness of not less than 0.3 to less than 1.0 mm and a hardness in Shore D hardness of not less than 35 to less than 55,
   the hardness, in Shore D hardness, of the intermediate layer is higher than the surface hardness of the center and the hardness of the cover, and
   when a deformation amount of the center and that of the core when applying from an initial load of 98 N to a final load of 1275 N are represented by "A (mm)" and "B (mm)" respectively, the value of the deformation amount difference (A–B) is within the range of not less than 0.15 mm to less than 0.35 mm.

5. The multi-piece solid golf ball according to claim 4, wherein the intermediate layer has a hardness, in Shore D hardness, of not less than 62 to less than 65.

6. The multi-piece solid golf ball according to claim 4, wherein the polyurethane-based thermoplastic elastomer of the cover is formed using cycloaliphatic diisocyanate.

* * * * *